(12) United States Patent
Lee et al.

(10) Patent No.: US 9,118,558 B2
(45) Date of Patent: Aug. 25, 2015

(54) SOFTWARE UPGRADES OF NETWORK ELEMENTS IN TELECOMMUNICATIONS NETWORK

(75) Inventors: Anthony Lee, Co. Meath (IE); Garrett Doyle, Dublin (IE)

(73) Assignee: TELEFONAKTIEBOLAGET L M ERICSSON (publ), Stockholm (SE)

( * ) Notice: Subject to any disclaimer, the term of this patent is extended or adjusted under 35 U.S.C. 154(b) by 930 days.

(21) Appl. No.: 13/141,320

(22) PCT Filed: Dec. 22, 2008

(86) PCT No.: PCT/EP2008/068195
§ 371 (c)(1),
(2), (4) Date: Sep. 8, 2011

(87) PCT Pub. No.: WO2010/072253
PCT Pub. Date: Jul. 1, 2010

(65) Prior Publication Data
US 2011/0314464 A1  Dec. 22, 2011

(51) Int. Cl.
*G06F 9/44* (2006.01)
*H04L 12/24* (2006.01)
*G06F 9/445* (2006.01)

(52) U.S. Cl.
CPC .............. *H04L 41/0869* (2013.01); *G06F 8/65* (2013.01); *G06F 8/67* (2013.01); *H04L 41/082* (2013.01); *H04L 41/085* (2013.01); *H04L 41/0863* (2013.01); *H04L 41/0866* (2013.01)

(58) Field of Classification Search
CPC ........................................................ G06F 8/65
USPC .......................................................... 717/168
See application file for complete search history.

(56) References Cited

U.S. PATENT DOCUMENTS

| 7,555,751 | B1* | 6/2009 | Abbavaram et al. ........... 717/168 |
| 2002/0078437 | A1 | 6/2002 | Grassman et al. |
| 2005/0108288 | A1* | 5/2005 | Hartshorne et al. ........... 707/200 |
| 2006/0041881 | A1* | 2/2006 | Adkasthala .................... 717/168 |
| 2006/0070023 | A1* | 3/2006 | D'Souza et al. ............... 717/104 |
| 2006/0130042 | A1 | 6/2006 | Dias et al. |
| 2007/0006207 | A1* | 1/2007 | Appaji ........................... 717/168 |

FOREIGN PATENT DOCUMENTS

| DE | 10148605 A1 | 4/2003 |
| WO | 98/53619 | 11/1998 |
| WO | 98/53619 A | 11/1998 |

OTHER PUBLICATIONS

PCT International Search Report, mailed Jun. 8, 2009, in connection with International Application No. PCT/EP2008/068195.
3GPP Technical Specification 25.433, V7.11.0, Technical Specification Group Radio Access Network; UTRAN Iub interface Node B Application Part (NBAP) signalling (Release 7), Dec. 2008.
Japanese Office Action, mailed Oct. 22, 2012, in connection with counterpart Japanese Application No. 2011-541114 (See translation below).
Foreign Associate provided translation of Japanese Office Action, mailed Oct. 22, 2012, in connection with counterpart Japanese Application No. 2011-541114.

\* cited by examiner

*Primary Examiner* — Wei Zhen
*Assistant Examiner* — Lanny Ung
(74) *Attorney, Agent, or Firm* — Leffler Intellectual Property Law, PLLC

(57) ABSTRACT

A method of upgrading software in network elements of a telecommunications network where operation of a plurality of network elements of a first type depends on operation of a network element of a second type. The method comprises receiving upgrade packages by the network element of the second type and at least part of the network elements of the first type. At least part of the network elements of the first type entering a waiting state and starting their upgrade when start of the upgrade of the network element of the second type is detected.

17 Claims, 4 Drawing Sheets

SOFTWARE UPGRADES OF NETWORK ELEMENTS IN TELECOMMUNICATIONS NETWORK

TECHNICAL FIELD

The present invention relates to telecommunications networks, in general, and in particular to upgrading software in network elements of the telecommunications network.

BACKGROUND

Currently telecom operators upgrade their Radio Network Subsystem (RNS), i.e. Radio Network Controller (RNC) and Radio Base Stations (RBS) at separate times and this happens generally during different maintenance windows (mostly at nights). When the RNC is being upgraded it does not handle any calls. Similarly, when the RBS is being upgraded it does not handle any calls.

In order to minimise the impact of such software upgrades on the operation of the network the RBSs are upgraded in batches. There are many ways to select batches of RBSs for upgrade. One, commonly used, is based on RBS type because of similar upgrade times.

SUMMARY

It is the object of the present invention to obviate at least some of the above disadvantages and provide an improved method of upgrading software in network elements of a telecommunications network.

According to a first aspect of the present invention there is provided a method of upgrading software in network elements of a telecommunications network where operation of a plurality of network elements of a first type depends on operation of a network element of a second type. The method comprises receiving upgrade packages by the network element of the second type and by at least part of the network elements of the first type. The at least part of the network elements of the first type enter a waiting state and they start an upgrade when upgrading of the network element of the second type is detected.

According to a second aspect of the present invention there is provided a network element of a first type for use in a telecommunications network adapted to enter waiting state after receiving an upgrade package. The network element of the first type is adapted to start upgrade after detecting that upgrade of the network element of a second type has started, wherein operation of said network element of the first type depends on operation of said network element of the second type.

According to a third aspect of the present invention there is provided a telecommunications network comprising a plurality of network elements of a first type and at least one network element of a second type, wherein operation of said network elements of the first type depends on operation of said network element of the second type. The network elements of both types are configured to receive upgrade packages. At least part of the network elements of the first type are adapted to enter waiting state after receiving said upgrade package. The network elements of the first type are also adapted to start upgrade when upgrading of the network element of the second type is detected.

Further features of the present invention are as claimed in the dependent claims.

The present invention provides the benefit of reduced traffic disturbance during WCDMA RNS upgrades and limited number of maintenance windows for RBS upgrades as these are reduced because a large amount of RBSs can be upgraded at the same time because the upgrade of an RNC takes significantly more time than the upgrade of an RBS due to the fact that RNC has a much larger number of modules to upgrade than the RBS.

BRIEF DESCRIPTION OF THE DRAWINGS

The present invention will be understood and appreciated more fully from the following detailed description taken in conjunction with the drawings in which.

DETAILED DESCRIPTION

Embodiments of the present invention are presented below in the context of Wireless Regional Area Networks (WRAN), however the invention is applicable also to other types of wireless telecommunications networks.

A large amount of RBS operation and maintenance traffic goes on interface commonly referred to as Mub through the RNC and so if the network operator wants to upgrade the RNC and RBS at the same time then it may not be possible because there is no way to synchronise the timing of the upgrade of the traffic handling part of the RNC with the impacted RBSs. This synchronisation is not possible in solutions known in the art because the Mub traffic would be interrupted by the RNC restart (or restart of the modules of the RNC controlling the RBS) if the Mub goes through the RNC. Furthermore the Mur link would be intermittent during the RNC upgrade so the timing of the RBS upgrade could not be coordinated by the OSS.

Figure 1:
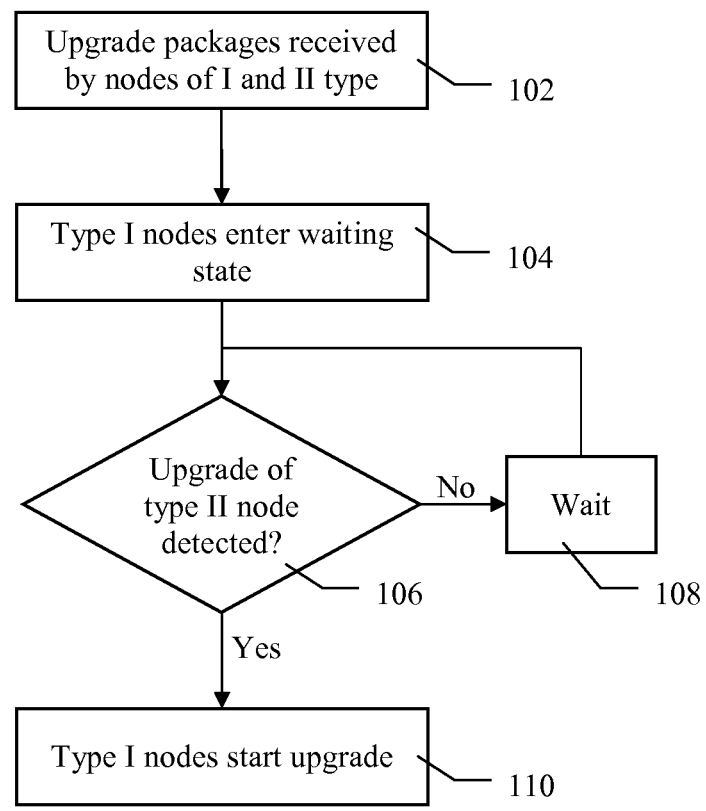
FIG. 1 is a diagram illustrating a method of upgrading software in network elements in one embodiment of the present invention.

With reference to FIG. 1 one embodiment of a method of upgrading software in network elements of a telecommunications network is presented. The invention is applicable to wireless telecommunications networks having network nodes of at least two types (i.e. the two types have two different roles in the network) and operation of a plurality of network elements of a first type depends on operation of a network element of a second type. In one embodiment a node of a first type is a Radio Base Station (RBS), illustrated in FIG. 4 as 402-408 and a node of a second type is a Radio Network Controller (RNC), 410.

The RNC 410 and RBSs 402-406 of the network 400 are selected by the OSS 420 for an RNS type upgrade. The RBSs 402-406 and RNC 410 receive 102 appropriate upgrade packages. Then, the required and known in the art pre-upgrade checks are carried out. In one embodiment after receiving the upgrade package and carrying out the required checks the RBSs, which received the upgrade package, enter a waiting state 104.

Figure 2:
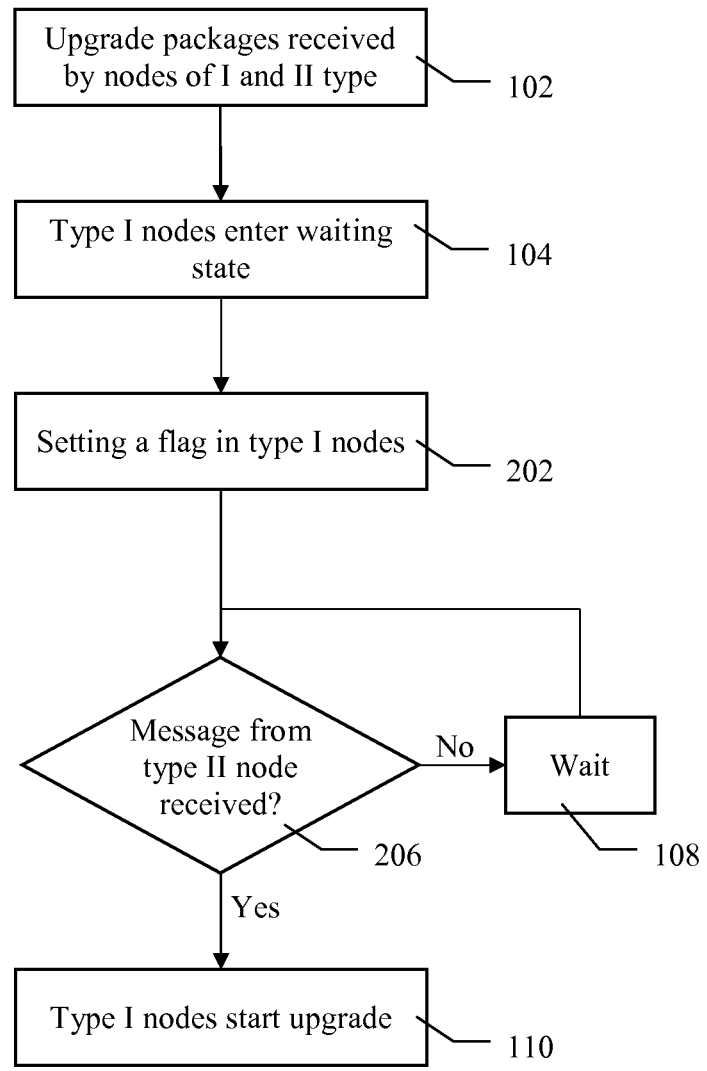
FIG. 2 is a diagram illustrating a method of upgrading software in network elements in alternative embodiment of the present invention.

Preferably, when OSS 420 triggers the RBSs to RNS type upgrade, the RBS, as shown in FIG. 2, in waiting mode sets a flag 202 to wait for the trigger from the RNC.

The upgrade of the RBSs starts, 110, when start of the upgrade of the network element of the second type is detected 106. When the RNC 410 is being upgraded it impacts traffic handling. In this situation the RNC 410 signals all RBSs 402-408 by sending a message, denoting that the RNC 410 cannot handle any traffic and the RBSs 402-408 can upgrade without any extra traffic disturbance. The Radio Base Stations wait for this trigger message, 206-108, from the RNC 410. The signal from the RNC 410 triggers the upgrade of RBSs 402-408 and the upgrade continues until the confirm-upgrade sequence which will be sent from the OSS 420. The term confirm-upgrade sequence refers to a message sent at the end of the upgrade in which the node signals the OSS that it is ready. The OSS (operator) confirms the upgrade (if everything is working well) by sending a signal to the RBS confirming that it can stay on the new upgrade package. If the RBS does not receive this signal it rolls-back to the previous version of the software.

In a real telecommunications network several types of Radio Base Stations are deployed. These could be different versions/models of the same supplier or even they can be from different suppliers. It may be that not all RBSs controlled by a given RNC 410 have to be upgraded as the upgrade may apply to one type of RBS only. In this situation the Radio Base Stations that have not been chosen for software upgrade, i.e. have not received the upgrade package and in consequence have not set the flag, will ignore this RNC trigger message and will not use this RNC signal for anything else.

In a preferred embodiment of this invention, the NBAP message CELL RECONFIGURATION REQUEST will be used by the RNC 410 to signal the RBSs 402-408 that the RNC 410 cannot handle any traffic and the RBSs 402-408 can upgrade without any extra traffic disturbance. NBAP (Node B Application Part) is in a UMTS Terrestrial Radio Access Network a signalling protocol responsible for the control of a Node B (Radio Base Station) by the RNC.

CELL RECONFIGURATION REQUEST message is specified in the table below with reference to standard 3GPP 25.433.

| IE/Group Name | Presence | Range | IE Type and Reference | Semantics Description | Criticality | Assigned Criticality |
|---|---|---|---|---|---|---|
| Message Discriminator | M | | 9.2.1.45 | | — | |
| Message Type | M | | 9.2.1.46 | | YES | reject |
| Transaction ID | M | | 9.2.1.62 | | — | |
| C-ID | M | | 9.2.1.9 | | YES | reject |
| Configuration Generation ID | M | | 9.2.1.16 | | YES | reject |
| Upgrade Trigger | O | | 9.2.1.xx | | YES | reject |

M = mandatory
O = optional

The new "Upgrade Trigger" (9.2.1.xx) Information Element is specified in the table below. Upgrade Trigger is a parameter that indicates whether the RNC is triggering the nodeB to upgrade, in other words it is an instruction received in said message to start the RBS upgrade.

| IE/Group Name | Presence | Range | IE Type and Reference | Semantics Description |
|---|---|---|---|---|
| Upgrade Trigger | | | ENUMERATED (Upgrade, Do Not Upgrade, ...) | If the flag RNS_Upgrade is set on the nodeB, this signal will trigger an Upgrade of the nodeB. |

In an alternative embodiment the signal triggering the upgrade is a wilting order received by the RBS from the RNC 410. The wilting order is a message from the RNC to a RBS (or even more than one RBS) ordering it to reduce transmission power. The reduction of the transmission power in cells of an RBS forces the user equipment to handover to other cells or other networks, e.g. GSM network operating in this area.

Time is saved because both upgrades are carried out at the same time and traffic is disturbed only once.

In an alternative embodiment this RNS upgrade is used as a method of testing RBS Emergency Upgrade (EU) in a test bed situation. First the EU is installed on the RBS 402-408 and then the RNC module is restarted. The restart of the RNC 410 initiates the RBS upgrades on the Iub defined on that module). In this way it is possible to check statistics of a specific module against other modules.

Figure 3:
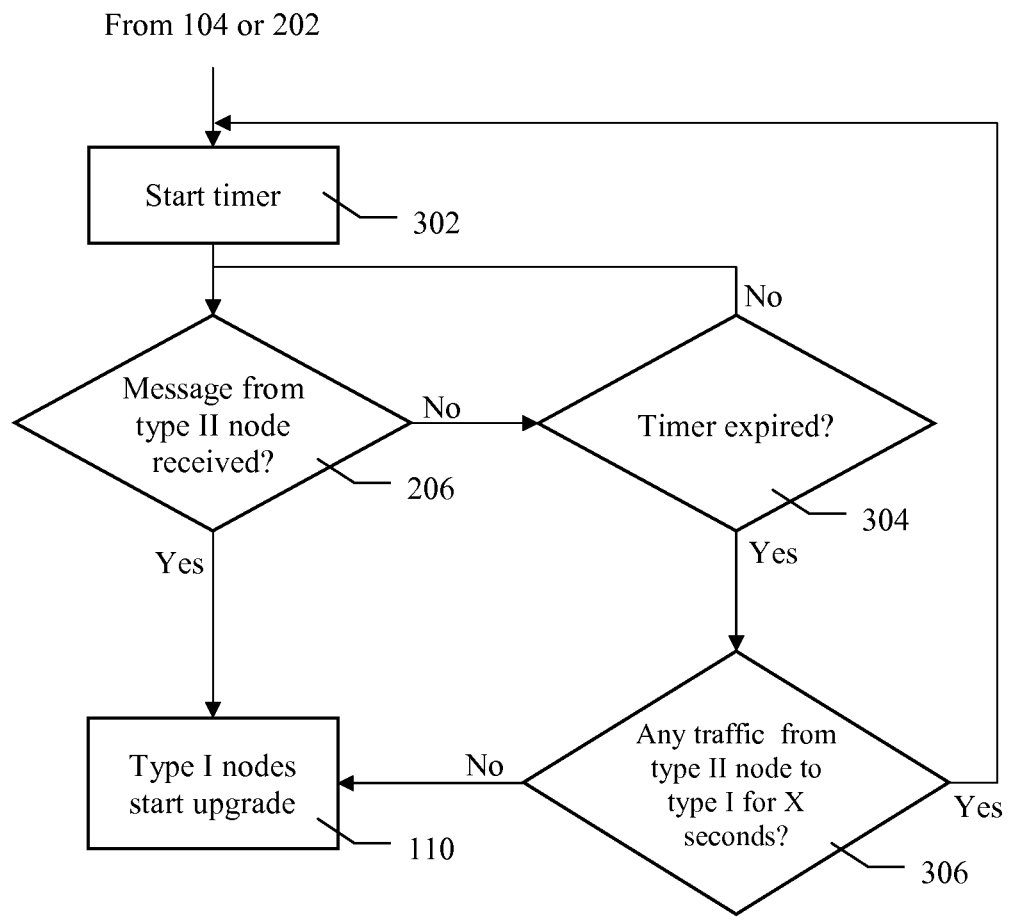
FIG. 3 is a diagram illustrating a method of upgrading software in network elements in alternative embodiment of the present invention.

In an alternative embodiment of the present invention, illustrated in FIG. 3, the Radio Network Controller 410 may not send any specific message 206 to trigger upgrade of the Radio Base Stations 402-408 which received upgrade packages. In this embodiment the RBSs, 402-408 check traffic 306 from said RNC to at least part of RBSs and if no traffic is detected for a defined period of time it is assumed that the RNC 410 is silent because its upgrade has started and then the upgrade of the software in said selected RBSs starts too 110.

Figure 5:
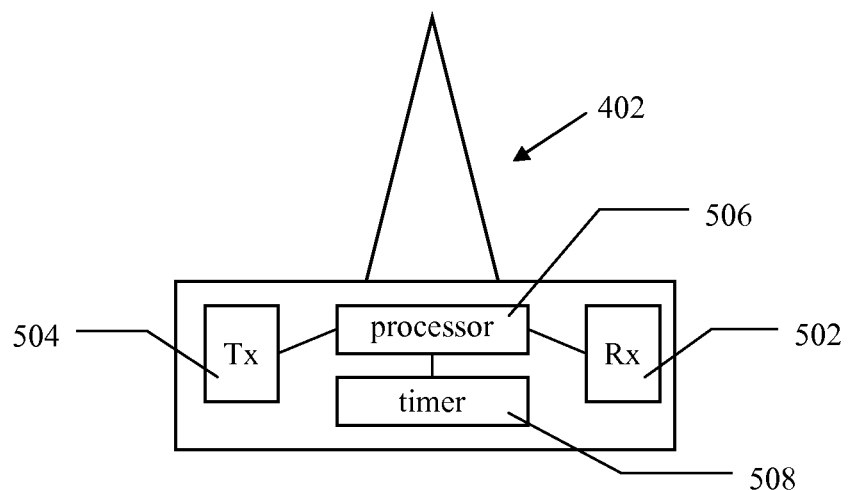
FIG. 5 illustrates a network element of a first type in one embodiment of the present invention.

In a preferred embodiment the method comprises starting 302 a timer 508 after entering the waiting state 104, 202 and waiting for a trigger for a message 206 from the RNC 410 until expiry 304 of the timer 508. If before the timer 508 expires a trigger message arrives the upgrade of the Radio Base Stations 402-408 starts 110. If, however, the RNC does not send any trigger message before the timer expired, 304, an RBS 402 checks if there is any traffic from the RNC 410 to said RBS 402. The RBS, as illustrated in FIG. 5 comprises a receiver unit 502 and a transmitter unit 504 operating as an interface for communicating with the Radio Network Controller 410. In the case of WCDMA network it is referred to as Iub interface. If there is no traffic, it indicates that the RNC is not active and the RBS starts the upgrade 110. The same operation is performed individually by all the RBS selected for upgrade. This operation is carried out individually by the RBSs as there was no central trigger message and it is up to each of the selected RBSs to check if the conditions for starting upgrade have been met and if the answer is "yes" to start the upgrade 110.

If there is any traffic detected, 306, it means that the RNC is active and the procedure is stopped, 308. In alternative embodiment instead of stopping the procedure the timer 508 is started once again and the procedure is repeated. In the embodiment shown in FIG. 5 the timer 508, the receiver and transmitter units, 502 and 504, (Iub interface) are controlled by a control unit 506 (e.g. a processor).

A radio network controller 410 operating in the network 400 comprises a number of modules and each of the modules controls a group of radio base stations, e.g. 402-404. Therefore, in a preferred embodiment, the upgrade 110 of at least part of radio base stations 402-404 starts when it is detected 106 that the module of the RNC 410 that controls said radio base stations 402 and 404 started upgrading. In this embodiment only part of the modules of the RNC 410 are upgraded and this allows for maintaining operation of part of the RBSs controlled by the modules that are not being upgraded. In this way the RNC 410 is at least partially operational and in consequence the impact of the upgrade on the network is reduced.

In an alternative embodiment it may be that the radio base stations are controlled by a node different than a radio network controller, for example different functions of the radio base station may be controlled by different nodes (i.e. the architecture differs from the RBS-RNC known from 3G networks). This, however, does not change the way the present invention works. If the process of upgrading of the controlling node (or its module) is detected by a controlled node (e.g. RBS) it means that the controlling node cannot handle any traffic from the RBS and this triggers upgrading of the RBS.

Figure 4:
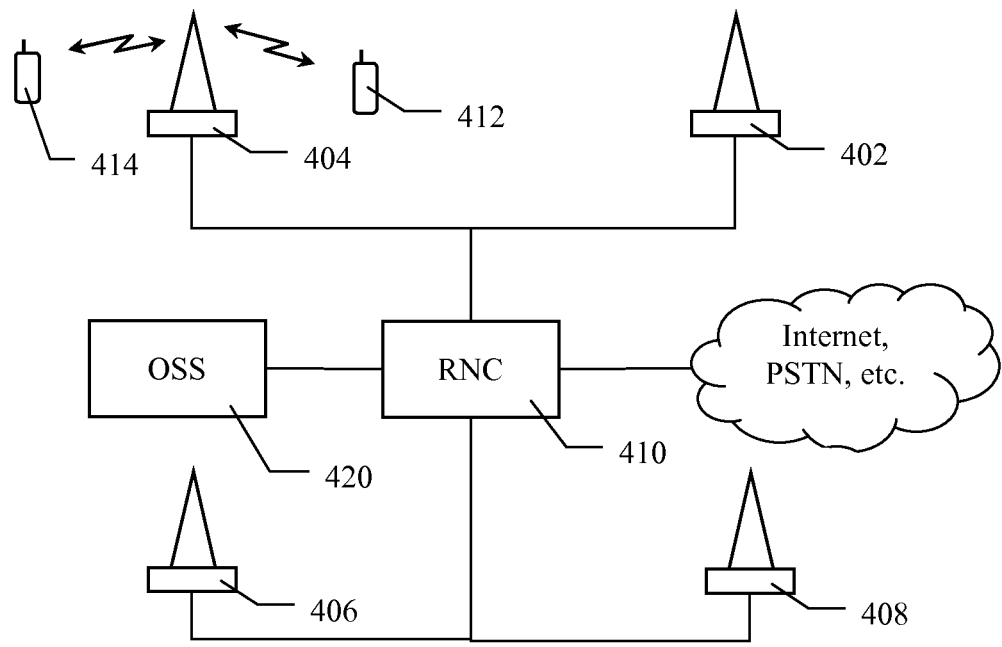
FIG. 4 is a diagram illustrating a telecommunications network in one embodiment of the present invention.

FIG. 4 illustrates one embodiment of a telecommunications network 400 in accordance with the present invention. The network 400 comprises a plurality of radio base stations 402-408 which provide access to the network to user equipment 412, 414. For clarity, only two user equipment 412 and 414 are shown at the drawing. The network 400 also comprises a radio network controller 410. In this arrangement of the network the operation of radio base stations 402-408 depends on operation of said radio network controller 410. When upgrade of a radio network subsystem is planned at least part of the radio base stations and the radio network controller 410 receive upgrade packages. The reason for only part of the RBS 402-408 receiving upgrade packages is that the RBSs can be supplied by different manufacturers and the upgrade may be for only some, but not all types of RBSs currently deployed in the network 400. It may be however that all RBSs are of the same type or that the upgrade is applicable to all RBSs. Those of the RBSs 402-408 that received the upgrade package enter a waiting state after receiving said upgrade package. Upgrading of the at least part of the RBSs 402-408 starts when start of the upgrade of the RNC 410 is detected.

In one embodiment the start of the upgrade of the radio network controller 410 is detected by the radio base stations by receiving a message from the RNC 410 instructing them to start the upgrade. This message is sent by the RNC 410 in connection with the start of the upgrade of said RNC 410. The message in one embodiment indicates that the radio network controller 410 cannot handle any traffic and the RBSs 402-408 use this message as a trigger to start their upgrade.

In yet another embodiment an RBS comprises a receiver, 502, via which it receives traffic from the RNC 410 and it starts the upgrade when no traffic is detected at the receiver for a defined period of time. Preferably the RBS comprises a timer 508 and said timer is started after entering the waiting state. The traffic from the RNC 410 to the RBS 402 is monitored and, if no message has been received before expiry of the timer, the upgrade of the RBS 402 is started. The same is applicable to other RBSs, 404-408, that have been selected for the upgrade, i.e. received the upgrade package.

The present invention can be used not only in the WRAN telecoms networks, but also in networks where one set of network node types are dependent on another network node type (functionally different). The dependency signalling is used to trigger the upgrade, down-time or maintenance of the dependant node. In this way overall network down-time is reduced.

The invention claimed is:

1. A method of upgrading software in network elements of a telecommunications network where operation of a plurality of network elements of a first type depends on operation of a network element of a second type, the method comprising:
   receiving upgrade packages by the network element of the second type and at least part of the network elements of the first type;
   entering a waiting state by the at least part of the network elements of the first type; and
   starting upgrade of the at least part of the network elements of the first type when upgrading of the network element of the second type, including an impacting of traffic handling by the network element of the second type, is detected,
   wherein said network elements of the first type receive a message from the network element of the second type indicating that the network element of the second type cannot handle any traffic and said at least part of the network elements of the first type use this message as a trigger to start the upgrade.

2. The method according to claim 1, wherein in the waiting state a flag is set in said at least part of the network elements of the first type to wait for signal from the network element of the second type.

3. The method according to claim 1, wherein said at least part of the network elements of the first type receive a message from the network element of the second type ordering them to start the upgrade.

4. The method according to claim 1, wherein said network elements of the first type check traffic from said network element of the second type to said at least part of the network elements of the first type and start the upgrade when no traffic is detected for a defined period of time.

5. The method according to claim 3, comprising:
   starting a timer after entering the waiting state;
   waiting for a message from the network element of the second type until expiry of the timer;
   checking traffic from said network element of the second type to said at least part of the network elements of the first type if no message has been received before expiry of the timer; and
   starting the upgrade when no traffic is detected for a defined period of time.

6. The method according to claim 1, wherein the network element of the first type comprises a radio base station and the network element of the second type comprises a radio network controller.

7. The method according to claim 1, wherein the upgrade of the at least part of the network elements of the first type starts when upgrading of at least one module of the network element of the second type that controls said at least part of the network elements of the first type is detected.

8. A network node of a first type for use in a telecommunications network adapted to enter a waiting state after receiving an upgrade package and to start upgrade after detecting that upgrade of a network node of a second type has started, including detecting an impacting of traffic handling by the network node of the second type, wherein operation of said network node of the first type depends on operation of said network node of the second type,
wherein the network node of the first type is adapted to receive a message from the network node of the second type indicating that the network node of the second type cannot handle any traffic and further adapted to use this message as a trigger to start the upgrade.

9. The network node of the first type according to claim 8 adapted to set a flag to indicate said waiting state.

10. The network node of the first type according to claim 8 adapted to receive a message from the network node of the second type and to start the upgrade following instruction received in said message.

11. The network node of the first type according to claim 8 comprising a receiver adapted to receive traffic from said network node of the second type and adapted to start the upgrade when no traffic is detected at the receiver for a defined period of time.

12. The network node of the first type according to claim 11 comprising a timer and adapted to start said timer after entering the waiting state and to check traffic received from said network node of the second type and to start the upgrade if no message has been received before expiry of the timer.

13. The network node of the first type according to claim 8 comprising a radio base station.

14. The network node of the first type according to claim 8, wherein said network node of the first type is adapted to start its upgrade when upgrading of a module of the network node of the second type that controls said network node of the first type is detected.

15. A telecommunications network comprising a plurality of network nodes of a first type and at least one network node of a second type, wherein operation of said network nodes of the first type depends on operation of said network node of the second type and the network nodes of both types are configured to receive upgrade packages and at least part of the network nodes of the first type are adapted to enter waiting state after receiving said upgrade package and to start upgrade of the at least part of the network nodes of the first type when upgrading of the network node of the second type, including an impacting of traffic handling by the network node of the second type, is detected,
wherein said network nodes of the first type are adapted to receive a message from the network node of the second type indicating that the network node of the second type cannot handle any traffic and to use this message as a trigger to start the upgrade of the network node of the first type.

16. The network according to claim 15, wherein said at least part of the network nodes of the first type is adapted to receive a message from the network nodes of the second type ordering them to start the upgrade.

17. The network according to claim 15, wherein said network nodes of the first type comprise respective receivers of traffic from said network node of the second type and are each adapted to start the upgrade when no traffic is detected at the receiver for a defined period of time.

* * * * *